March 2, 1965 R. H. TERLET 3,171,964

PULSE FORMER USING PHOTOCONDUCTIVE SWITCHES

Filed Dec. 28, 1962 2 Sheets-Sheet 1

INVENTOR.
RENÉ H. TERLET

BY Curtis Ailes Jr

ATTORNEY

United States Patent Office 3,171,964

Patented Mar. 2, 1965

3,171,964
PULSE FORMER USING PHOTOCONDUCTIVE SWITCHES

René H. Terlet, San Jose, Calif., assignor to International Business Machines Corporation, New York, N.Y., a corporation of New York Filed Dec. 28, 1962, Ser. No. 248,060
6 Claims. (Cl. 250—209)

Figure 1:
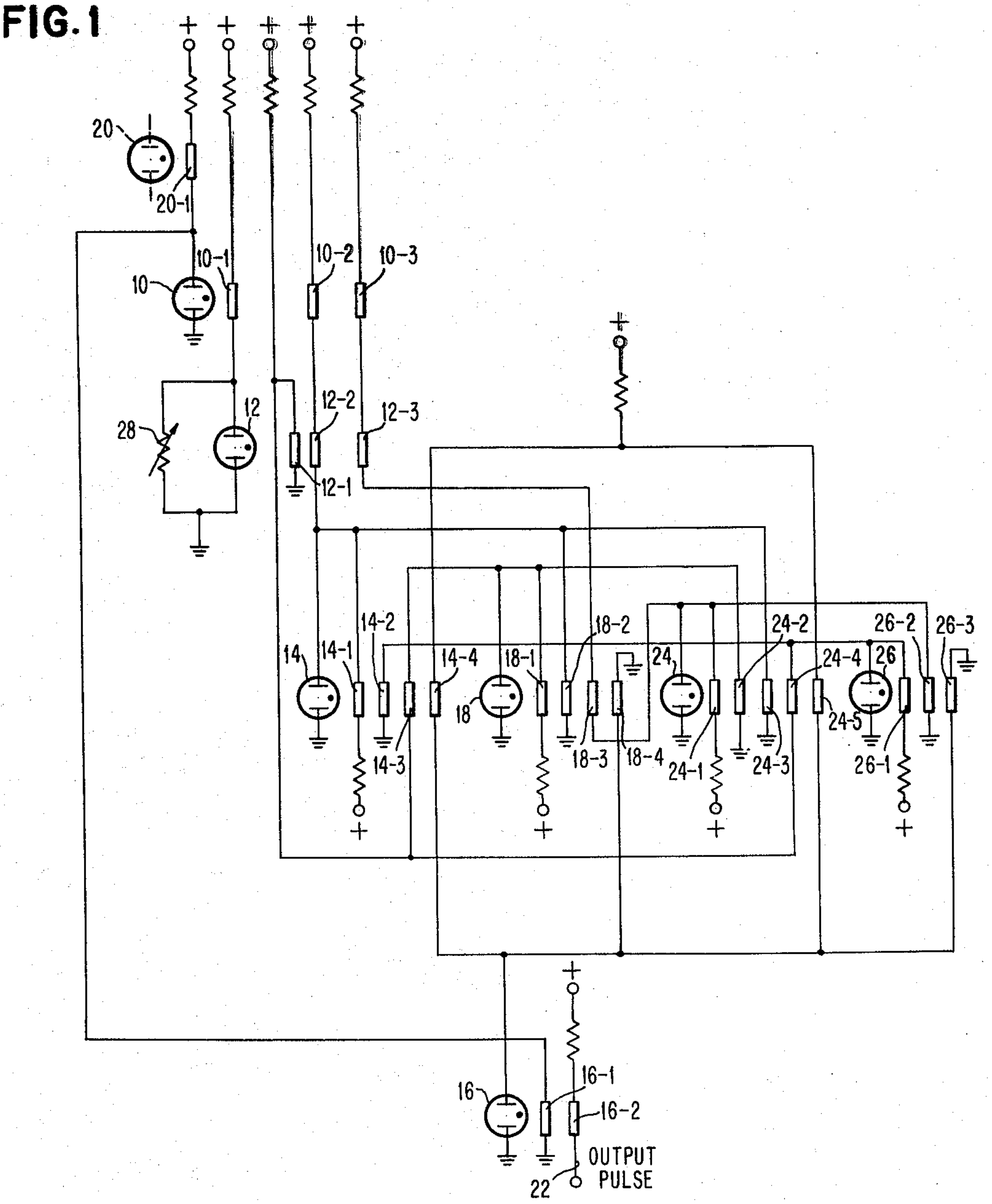

This invention relates to circuits which are capable of forming an output pulse of a predetermined shape in response to an input signal, and more particularly to pulse formers which may be conveniently embodied in circuitry employing photoconductors and which are particularly well adapted for incorporation in larger systems embodied with photoconductors.

In logical circuitry such as is used in telephony, or in data processing or computing equipment, one of the major needs is for economical circuits for the production of precisely shaped pulses which may be required in response to input signals which are in the form of pulses of short or prolonged duration.

Accordingly, it is one object of the present invention to provide circuitry which is economical and which is capable of producing timed pulses.

Another object of the present invention is to provide a circuit which is capable of operating as a pulse shaper or pulse amplifier to provide an output pulse of desired amplitude and duration in response to an input pulse.

Another object of the invention is to provide a repetitive pulse generator which is capable of delivering a succession of pulses and in which the "pulse on" and the "pulse off" periods are of desired duration.

Most pulse forming circuits employ some means for timing the duration of the pulse to be formed and the means often employed includes a capacitor. The capacitor is connected in some manner in the circuit so that the time which is taken for a change in charge condition of the capacitor provides the desired time delay of the circuit. Such capacitor timing circuits are usually quite satisfactory. However, capacitors are generally rather expensive devices and accordingly it is economically desirable to eliminate the capacitors if possible.

Accordingly, it is another object of the present invention to provide a pulse former circuit which does not require the incorporation of a capacitor as a timing device.

Large systems employing voltage responsive lamps and associated photoconductors arranged for illumination by the lamps as the main switching device provide many attractive advantages, including the advantage of very economical cost. However, one important problem encountered in such systems involves the rather wide variations in the operating voltages and operating speeds of the switching devices in response to different conditions of temperature, ambient illumination, power supply voltage, the length of the period of dormancy prior to operation, and the age of the components. Because of these many factors which can cause variations in operating speeds of the components and of the systems of which they are a part, the design of a pulse former for operation as a component with such systems presents a serious difficulty in conventional pulse former construction. This arises from the fact that a pulse former is usually designed to deliver a pulse which has a relatively fixed duration determined by a timing circuit which may, for instance, employ a capacitor as the timing element. However, for lamp-photoconductor systems, it is desirable to have a pulse former which will provide a pulse of variable duration depending on the conditions which cause variations in the system operating speed. For instance, there should be a relatively short pulse under conditions where the lamp-photoconductor combinations are switching rapidly, and a relatively long pulse under conditions where the lamp-photoconductor components are operating slowly.

Accordingly, it is another important object of the present invention to provide a pulse former which delivers an output pulse having a duration which is generally proportional to the operating speeds of the switching devices of a larger associated system, and which is responsive to vary the pulse duration in accordance with the same variable factors which cause changes in the operating characteristics of the lamp photoconductor components.

Other objects and advantages of the invention will be apparent from the following description and the accompanying drawings.

In carrying out the objects of the invention in one embodiment thereof, there is provided a pulse former including a plurality of cascade connected switching devices each having a pick-up switch element connected to turn on the following switching device. The last of the devices includes at least one switch element arranged to provide an output signal. One of the devices connected intermediate to the first and last of the devices being a storage device including a self-latching circuit to maintain the storage device in the energized condition independent of the preceding device. The storage device is provided with a switch element connected to form a pick-up circuit to energize a second storage device. One of the switching devices preceding the first storage device in the cascade connection includes a switch element connected to maintain the second storage device in a disabled condition. The last of the switching devices in the cascade connection includes a switch element connected to form a disablement circuit to disable the first switching device to provide for collapse of the chain of signals in the switching devices preceding the first storage device in the cascade connections. The switching device preceding the first storage device being deenergized and turned off upon the collapse of the chain of signals to release the second storage device disablement circuit, and the second storage device includes a switch element connected to disable the first storage device.

For a more complete understanding of the invention, reference is made to the following description and the accompanying drawings which are briefly described as follows:

FIG. 1 is a schematic circuit diagram of a preferred lamp-photoconductor embodiment of the present invention.

Figure 1A:
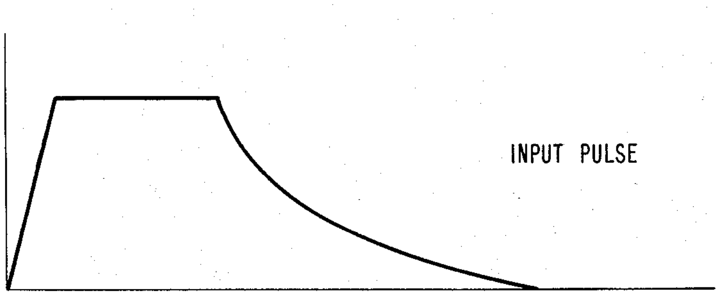

FIG. 1*a* is an idealized curve showing a typical input signal to the circuit of FIG. 1.

Figure 1B:
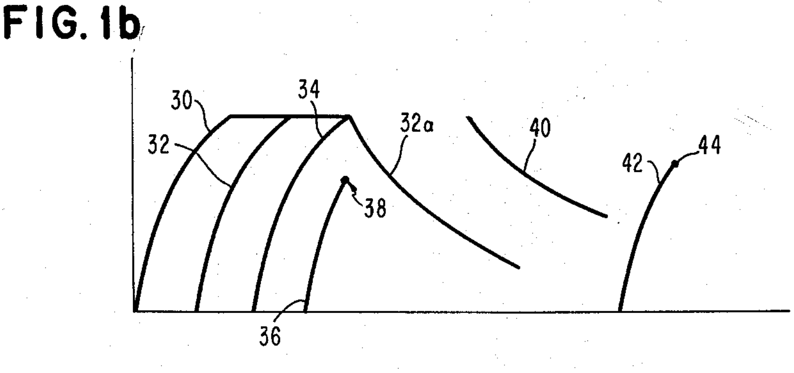
Figure 1C:
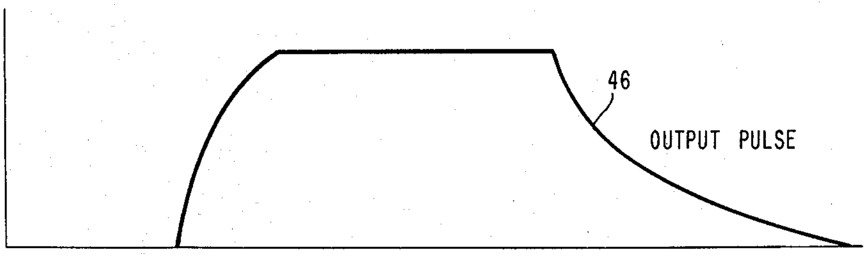

FIG. 1*b* is an idealized composite diagram showing the critical changes in photoconductivity of various important photoconductor elements of the circuit of FIG. 1, and FIG. 1*c* is an idealized curve illustrating the output pulse which is available from the circuit of FIG. 1.

FIG. 1, shows a number of lamp-photoconductor switching devices connected in a cascade arrangement. For instance, lamps 10, 12, 14 and 16 are arranged so that a photoconductor 10–1 illuminated by lamp 10 completes an energizing circuit for lamp 12, a photoconductor 12–2 illuminated by lamp 12 completes an energizing circuit to lamp 14, and a photoconductor 14–4 illuminated by lamp 14 completes an energizing circuit for lamp 16. The switching device 14 also constitutes a storage device for it includes a self-latching circuit which maintains the energization through its own photoconductor 14–1. A second storage device is provided in the form of lamp 18 and its associated photoconductors. A pick-up or energizing circuit for storage device 18 is provided through one of the photoconductors 14–3 illuminated by storage lamp 14. However, this energizing circuit is disabled whenever lamp 12 is illuminated by the associated photoconductor 12–1.

An input signal is provided to the circuit by energizing the lamp 10. This may be accomplished by any conventional switching device, or it may be accomplished by means of an optical input which may be provided from a lamp such as lamp 20, which illuminates an associated photoconductor 20–1 to energize lamp 10. The cascaded lamps 10, 12, 14 and 16 are then illuminated in sequence. However, the first photoconductor 16–1 of lamp 16, is connected to provide a disabling shunt circuit for the input lamp 10 to cause a collapse of the chain of signals in the cascaded connections. The collapse of signals stops at the storage lamp 14 which is latched on through its own photoconductor 14–1. Therefore, the energization of the lamp 16 is continued through photoconductor 14–4. However, as soon as the lamp 12 is extinguished and the associated photoconductor 12–1 has sufficient time to regain its dark impedance, the pickup circuit through photoconductor 14–3 is no longer disabled, and lamp 18 accordingly is energized and illuminated. Then a photoconductor, 18–2, associated with lamp 18 provides a disablement circuit for lamp 14, causing lamps 14 and 16 to be extinguished. In order to provide a more positive extinguishment of lamp 16, a photoconductor 18–4, also illuminated by lamp 18, provides a shunting disablement circuit for the lamp 16. A photoconductor 16–2 illuminated by lamp 16 provides an output pulse at the output terminal 22 for a period which is determined by the period of illumination of lamp 16.

Throughout the drawing, the small rectangular symbols such as are used for photoconductors 14–1 and 14–4 signify devices which have photo-responsive properties which are commonly referred to as photoconductors. Since they are devices which have a lowered impedance when they are illuminated, they are more accurately described as photo-responsive impedance devices, but the popular "photoconductor" term is used in this specification. The preferred photoconductor devices will be described more fully below. Throughout the drawing the convention is followed that each photoconductor device is arranged to be illuminated only by the first light source positioned to the left of that photoconductor in the drawing. Thus, photoconductors 14–3 and 14–4 are illuminated only by lamp 14, and not by lamp 18.

It is contemplated that the impedance of one of the photoconductor switching elements employed in the embodiment of FIG. 1 may be at least in the order of 200 megohms when not illuminated. But, when it is subjected to illumination, its resistance may drop to a typical value in the order of 50,000 ohms and very seldom will the illuminated impedance go below a value of 10,000 ohms. Thus, it is to be seen that a device having a minimum resistance of thousands of ohms, although commonly referred to as a photoconductor, should be more accurately described as an impedance having photoresponsive properties. However, the term "photoconductor" and the like is used in this specification, keeping these qualifications in mind. In the description of the circuit, for convenience, circuit paths are often described as "completed" or switched by the illumination of a particular photoconductor. It will be understood that this is not strictly correct because such a statement really means that a circuit path of lowered impedance is created by illumination of a photoconductor in a circuit which already exists.

Photoconductive devices having impedance characteristics as described above are commercially available. For instance, one such device may be purchased from the Clairex Corporation, of 50 West 26th Street, in New York City, under model number CL3A.

The typical impedance of the photoconductor as indicated above, at 50,000 ohms when illuminated, is applicable when the illumination is from a neon glow lamp positioned within reasonable proximity to the photoconductor. Small, inexpensive neon glow lamps which are suitable for this purpose are commonly available. A typical device of this kind is available, for instance, from the General Electric Company under Model No. NE–2. Such a device may require about 70 volts to initiate glow conduction when new, but after appreciable aging has occurred the firing voltage may advance to the order of 115 volts. After the lamp has become illuminated, a negative resistance effect is to be observed such that the voltage across the glow lamp may drop to about 55 volts. As the lamp ages, this voltage also rises to a maximum value in the order of 100 volts. The current required for such a neon lamp may vary from one quarter of a milliampere to one milliampere.

It will be appreciated that various other voltage responsive light source devices may be employed in embodying this invention and that other photoresponsive devices may be used to detect the illumination from such devices. For instance, the voltage responsive light sources may be electroluminescent devices, or incandescent filament devices, or devices employing gaseous discharges to derive illumination from fluorescent coatings. In each instance photoconductive devices are selected which are particularly responsive to the spectrum of light emitted by the light source employed. Fortunately, the neon lamps mentioned above and the photoconductive devices mentioned above work well together. Accordingly, the neons are preferred, and the light sources in the present specification are all indicated as being neon light sources, but it will be understood that other sources may be employed if desired.

One important advantage of the neon glow lamp as an electrical voltage responsive light source in the present system is the fact that it remains substantially completely dark until its firing voltage threshold is achieved, at which time it suddenly provides substantially full output illumination with a reduced voltage requirement. This characteristic is very desirable because it prevents false operation as long as the voltage is below the threshold value. It also provides for positive operation whenever the voltage goes above the threshold.

With neon glow lamps, it is generally necessary that some series impedance be employed, as well as some shunt impedance. The value of each of the shunt impedances is preferably about one megohm. This one megohm shunt across each neon serves to set a maximum impedance for the neon with respect to the remainder of the circuit. Although impedance values for the various circuit components are not specified, it will be understood that whenever operation is required to provide output illumination, the series impedances for the various neons generally will be so chosen as to result in a neon current in the order of one milliampere.

In order to simplify the drawings and make them clearer and more easily understood, all of the lamp shunt impedances except that on lamp 12 are omitted from the drawings, but it will be understood that such impedances are to be employed in the practical embodiments of the invention.

Also, to further simplify the drawings, the power supply connections are not wired in, either at the common ground connection or at the high voltage connections. The common ground connections are indicated conventionally by the ground symbol, and the high voltage connections are indicated by a terminal symbol with a + sign. The value of the supply voltage may be selected to conform to the impedance values and the current requirements of the circuit design. A good workable value of supply voltage has been found to be about 300 volts. When employing neon lamps as the light sources, it has been found desirable to employ a direct current power supply source, or an alternating current power supply at a frequency of about 1,000 cycles. With other light sources, other voltages and frequencies may be employed. Conventional sources of power may be employed to obtain satisfactory operation of the systems of the present invention.

Referring again to the FIG. 1 circuit diagram, storage devices including the lamps indicated at 24 and 26 are provided in association with the first and second storage devices 14 and 18. The storage device including the lamp 18 includes a pick-up switch element 18–3 which completes an energizing circuit to the lamp 24 from photoconductors 12–3 of switching device 12, and 10–3 of switching device 10. Each of the storage devices 18, 24 and 26 is provided with a self-latching circuit. These include associated photoconductors respectively indicated at 18–1, 24–1 and 26–1.

The storage device including lamp 24 is somewhat similar in function and in operation to the storage device including lamp 14. Thus, for instance, it includes a photoconductor 24–5 connected in parallel with photoconductor 14–4 to complete an energizing circuit for lamp 16. It also includes a photoconductor 24–4 for the completion of an energizing circuit to the succeeding storage device 26, and this energizing circuit is common with the energizing circuit including photoconductor 14–3 for lamp 18. Also included is a photoconductor 24–2 connected to disable the preceding storage device including lamp 18. A photoconductor 24–3 is provided which is connected to continue the disablement of storage device lamp 14 which was previously provided by photoconductor 18–2.

The storage device including lamp 26 is somewhat similar in function and operation to the storage device including lamp 18. Thus, it includes a disablement circuit for the previous storage device 24 provided by the photoconductor 26–2. Also, a photoconductor 26–3 is connected in parallel with photoconductor 18–4 for disabling the energizing circuit of lamp 16.

A more detailed explanation of the operation of the system of FIG. 1 is as follows: an input signal which may represent illumination from lamp 20 is received by photoconductor 20–1, completing an energizing circuit for lamp 10. Lamp 10 illuminates all of its associated photoconductors 10–1, 10–2 and 10–3. The illumination of photoconductor 10–1 completes an energizing circuit for lamp 12 which then illuminates all of its associated photoconductors 12–1, 12–2, and 12–3. The circuit including photoconductors 10–2 and 12–2 completes an energizing circuit for the storage switching device lamp 14. The resultant illumination of associated photoconductor 14–4 completes an energizing circuit for lamp 16. The resultant illumination of output photoconductor 16–2 provides the beginning of an output signal at terminal 22. The illumination of lamp 14 energizes a self-latching circuit through photoconductor 14–1 and an energizing (pick-up) circuit for storage device lamp 18 through photoconductor 14–3. However, this energizing pick-up circuit while not yet effective to turn-on lamp 18 because of the disablement of the pick-up circuit by the shunt photoconductor 12–1, does enable the switching device lamp 18 so that when the pick-up circuit ceases to be disabled by shunt photoconductor 12–1 the lamp 18 will turn on.

The illumination of photoconductor 16–1 provides a shunting disablement circuit to extinguish lamp 10. Then, the current in the associated photoconductor 10–1 decays because of the removal illumination. The rate at which the current drops in the photoconductor 10–1 determines the remaining time during which there is appreciable illumination available from lamp 12. This photoconductivity decay time is dependent upon the values of the other impedances of the energizing circuit of lamp 12. This is particularly true of the value of the shunt impedance 28. Impedance 28 is preferably variable so that some adjustment is available in the operation of the circuit and in the length of the output signal pulse available from the circuit.

When the illumination from lamp 12 has collapsed sufficiently, the disablement provided by photoconductor 12–1 is no longer effective to hold off the energization of storage lamp 18. Accordingly, lamp 18 is illuminated and latched in the self-energized condition through its photoconductor 18–1 which is independent of the previously disabled pick-up circuit through photoconductor 14–3. The associated photoconductor 18–2 then disables the storage device 14, and also the photoconductor 18–4 disables the switching device lamp 16. In one anticipated mode of operation, the input signal pulse from lamp 20 will have terminated by this time so that the circuit will remain with storage lamp 18 latched on, and all of the other lamps extinguished. It is contemplated that an appreciable number of additional photoconductors may be provided in association with lamp 16 and connected to disable a number of switching devices, such as lamp 20, which may be employed in a larger system from which the input signal to the circuit of FIG. 1 is supplied.

When the next input pulse is provided through photoconductor 20–1, lamps 10 and 12 will again be illuminated. However, lamp 14 cannot be illuminated for it remains disabled through the disablement photoconductor 18–2. Furthermore, storage device lamp 18 is not disabled by the photoconductor 12–1, for it is independently self-energized through the latching photoconductor 18–1. However, the circuit including photoconductors 10–3 and 12–3 is effective through the pick-up photoconductor 18–3 to energize lamp 24. Storage lamp 24 is then self-energized through latching photoconductor 24–1 and it disables storage device lamp 18 through the shunt photoconductor 24–2. At the same time it provides an energizing circuit for lamp 16 through photoconductor 24–5 and it continues the disablement of storage device lamp 14 through disabling photoconductor 24–3. The pick-up photoconductor 24–4 is also illuminated, but it is not yet effective to energize storage device lamp 26 because the associated circuit is disabled by shunt photoconductor 12–1 as long as lamp 12 is illuminated. However, as soon as the photoconductor 16–1 is effective to collapse the cascade connections of lamps 10 and 12 and to remove the disablement provided by photoconductor 12–1, then storage device lamp 26 is energized through the photoconductor 24–4, and latches in the self-energized condition through photoconductor 26–1. The storage device lamp 24 is then shut off through the disablement photoconductor 26–2, and the lamp 16 is shut off through the disablement photoconductor 26–3. Again, if the input signal to photoconductor 20–1 has been terminated, storage device lamp 26 is latched in the self-energized condition and all of the other lamps of the circuit are extinguished.

Storage device lamp 26 does not have an associated photoconductor connected to disable storage device lamp 14. Accordingly, when the next input pulse is received, storage device lamp 14 will again be energized through the energizing circuit including photoconductors 10–2 and 12–2. Associated with lamp 14, there is a photoconductor 14–2 which is connected to disable the storage device lamp 26. Therefore, the original operating cycle condition of the circuit is re-established.

Thus, a complete cycle of operation of the circuit of FIG. 1 in response to an input pulse at photoconductor 20–1 includes the sequential operation of lamps 10, 12, 14 and 16, then the extinguishment of lamps 10 and 12, followed by the energization and illumination of lamp 18. This is followed by the substantially concurrent extinguishment of lamps 14 and 16. When the next pulse is received, a similar sequence is performed with lamp 24 taking the place of lamp 14 and lamp 26 taking the place of lamp 18, lamp 18 being turned off as lamp 16 is turned on. Thus, the sequence is as follows: lamps 10, 12 and 24 are turned on and lamp 16 is turned on as lamp 18 is turned off. Then, as photoconductor 16–1 turns off lamps 10 and 12, storage device lamp 26 is energized, shutting off storage device lamp 24, and output switching device lamp 16. When a third input pulse is received, the sequence is repeated with lamps 14 and 18 being operable instead of lamps 24 and 26. In response to the fourth input pulse, storage device lamps 24 and 26 will again be operable while lamps 14 and 18 will be inoperable. Thus, it is seen that upon repeated signals, the pairs of storage device lamps 14 and 18 and 24 and 26 will alternate in operation, but the output pulse available from photoconductor 16–2 or other similar photoconductors associated with lamp 16 (not shown) will be substantially the same.

If the input signal at photoconductor 20–1 is a continuing signal rather than a pulse, the circuit of FIG. 1 will recognize the continuation of the signal as though it were an additional input pulse and will continue through repeated cycles of operation to provide a series of output pulses. This mode of operation is useful for some purposes.

FIG. 1*a* shows a typical input pulse to the system of FIG. 1, FIG. 1*c* shows a typical output pulse, and FIG. 1*b* is a composite operating characteristic diagram showing an idealized representation of certain variations in photoconductivity of the various photoconductor switching elements which are critical in determining the relationship between the input pulse and the output pulse. For instance, curve 30 shows the rise in photoconductivity of the input photoconductor 20–1. Curve 32 shows the resultant rise in photoconductivity of the photoconductor 12–2 after lamp 12 has been turned on through the circuit provided by photoconductor 10–1. Curve 34 represents the rise in photoconductivity of photoconductor 14–4 to energize lamp 16, and curve 36 represents the rise in photoconductivity of photoconductor 16–1. As the photoconductivity of photoconductor 16–1 rises, as shown by the curve 36, to a point indicated at 38, the disablement effect on lamp 10 is sufficient to extinguish lamp 10, and curve 32*a* then represents the decay of the resultant photoconductivity of the associated photoconductor 10–1. Curve 40 illustrates the decay in photoconductivity of photoconductor 12–1 which results from the decreasing illumination available from lamp 12 in response to the decay in photoconductivity of photoconductor 10–1. As explained previously, when the decay in photoconductivity of 12–1 proceeds to a sufficient degree, then one of the storage device lamps 18 or 26 is energized. The resultant increase in photoconductivity of a photoconductor such as 18–4 is then indicated by the curve 42. As this photoconductivity increases to the point where it shuts off lamp 16, such as at the point indicated at 44, then the output pulse is terminated in accordance with the decreasing photoconductivity of photoconductor 16–2. This is indicated at 46 in FIG. 1*c*.

It is clear from the above description that the pulse former embodied as shown in FIG. 1 satisfies all of the objectives of the present invention. Thus, a timed pulse is obtainable from the circuit without resorting to the use of components as expensive as capacitors to provide the timing function. Furthermore, the pulse length available from the circuit is somewhat variable depending upon the various operating conditions of the circuit and this is desirable because the pulse length thus automatically matches with the operating characteristics of a larger system composed of similar components. This is an important principle of the present invention which is believed to be applicable to systems which may be embodied in devices and technologies other than lamp-photoconductor devices.

While the invention has been particularly shown and described with reference to a preferred embodiment thereof, it will be understood by those skilled in the art that various changes in form and details may be made therein without departing from the spirit and scope of the invention.

What is claimed is:

1. A pulse former comprising:

a plurality of cascade connected switching devices comprising a first and last switching device, one of said switching devices connected intermediate to said first and said last switching devices being a first storage device, said first storage device including a self-latching circuit electrically connected thereto to maintain said first storage device in the energized condition independent of the energization condition of the preceding device;

a plurality of pick-up switch elements each associated with one of said switching devices and each electrically connected to a succeeding switching device for energizing said succeeding switching device in response to the energization of the preceding switching device;

an output switch element associated with said last switching device to provide an output pulse in response to the energization of said last switching device;

a second storage device;

a pick-up circuit comprising a first switch element associated with said first storage device and electrically connected to said second storage device to enable said second storage device;

a second switch element associated with the one of said switching devices preceding said first storage device in said cascaded connection, said second switch element being electrically connected to said second storage device and adapted to maintain said second storage device in a disabled condition when said one switching device preceding said first storage device in said cascaded connection is energized;

a third switch element associated with said last of said cascade connected switching devices, said third switch element being electrically connected to said first switching device and adapted to disable said first switching device to provide for the collapse of the chain of signals in said switching devices preceding said first storage device in said cascaded connection of devices whereby said second switch element energizes said second storage device; and a fourth switch element associated with said second storage device, said fourth switch element being electrically connected to said first storage device and adapted to disable said first storage device in response to the energization of said second storage device.

2. A pulse former comprising:

first, second, third and fourth cascade connected switching devices, said first, second and third devices having a pick-up switch element associated therewith and electrically connected to the following switching device and adapted to turn on said following switching device in response to the energization of the preceding device;

said fourth device including at least a first switch element associated therewith and adapted to provide an output pulse in response to the energization of said last device;

said third device comprising a first storage device including a second switch element associated therewith and electrically connected thereto in a first self-latching circuit configuration to maintain said device in the energized condition independent of the preceding device;

a second storage device having a second self-latching circuit associated therewith and electrically connected thereto;

said first storage device comprising a third switch element associated therewith and electrically connected to said second storage device, said third switch element being adapted to enable said second storage device;

said second switching device including a fourth switch element associated therewith and electrically connected to said second storage device, said switch element being adapted to maintain said second storage device in a disabled condition;

the fourth of said switching devices including a fifth switch element associated therewith and electrically connected to said first switching device and being adapted to disable said first switching device to provide for deenergization of said first and second switching devices, thereby energizing said second storage device; and said second storage device including a sixth switch element associated therewith and electrically connected to said first storage device, said sixth switch element being adapted to disable said first storage device in response to the energization of said second storage means.

3. A pulse former comprising:

first, second, third and fourth cascade connected switching devices, said first, second and third devices having a pick-up switch element associated therewith and electrically connected to the following switching devices, said switch elements being adapted to turn on the following switching device upon the energization of the preceding switching device;

said fourth device including at least a first switch element associated therewith and adapted to provide an output pulse upon the energization of said fourth switching device;

said third device comprising a first storage device including a second switch element associated therewith and electrically connected thereto in a self-latching circuit configuration to maintain said device in the energized condition independent of the preceding device;

a second storage device having a self-latching circuit electrically connected thereto;

said first storage device having a third switch element associated therewith and electrically connected to said second storage device, said third switch element being adapted to form a pick-up circuit to enable said second storage device;

said second switching device including a fourth switch element associated therewith and electrically connected to said second storage device, said fourth switch element being adapted to maintain said second storage device in a disabled condition;

said fourth switching device including a fifth switch element associated therewith and electrically connected to said first switching device, said fifth switch element being adapted to disable said first switching device to provide for deenergization of said first and second switching devices thereby energizing said second storage device;

said second storage device including a sixth switch element associated therewith and electrically connected to said first storage device, said sixth switch element being adapted to disable said first storage device upon the energization of said second storage device;

third and fourth storage devices, said second and third storage devices each having pick-up switch elements associated therewith and electrically connected to said third and fourth storage devices, respectively, said pick-up switch elements being adapted to energize said third and fourth storage devices, respectively;

said third and fourth storage devices each having self-energizing switch elements, said third and fourth storage devices each including switch elements associated therewith and electrically connected to said second and third storage devices, respectively, said switch elements being adapted to disable said second and third storage devices, respectively;

said third storage device including a switch element associated therewith and electrically connected to said first storage device, said switch element being adapted to disable said first storage device, said third storage device also including a switch element associated therewith and electrically connected to said fourth switching device, said switch element being adapted to provide a pick-up circuit for said fourth switching device;

said last-mentioned switch element being connected in parallel with the pick-up switch element of said first storage device;

the pick-up circuit for said fourth storage device being connected in parallel with the pick-up circuit for said second storage device and subject to disablement by the disablement switch element of said second switching device.

4. A photologic pulse former comprising:

a plurality of cascade connected lamp-photoconductor switching devices each comprising a voltage responsive lamp and a plurality of associated photoconductors arranged for illumination thereby, each of said devices having a pick-up photoconductor optically associated therewith and electrically connected to the following device, said pick-up photoconductors being adapted to turn on the following device lamp, the last of said devices including at least one photoconductor optically associated therewith and adapted to provide an output signal upon the energization of said last device;

one of said devices connected intermediate to the first and last of said devices being a storage device including a photoconductor electrically connected thereto in a self-latching circuit configuration to maintain said device in the energized condition independent of the preceding device;

a second lamp-photoconductor storage device;

said first storage device having a photoconductor optically associated therewith and electrically connected to said second storage device, said photoconductor being adapted to form a pick-up circuit to enable said second storage device;

the one of said switching devices immediately preceding said first storage device in said cascade connection including a photoconductor optically associated therewith and electrically connected to said second storage device, said photoconductor being operable when illuminated to maintain said second storage device in a disabled condition;

the last of said switching devices in said cascade connection including a photoconductor optically associated therewith and electrically connected to said first switching device, said photoconductor being adapted to form a disablement circuit to disable said first switching device by shunting the lamp thereof to provide for collapse of the chain of signals in said switching devices preceding said first storage device in said cascade connection thereby energizing said second storage device; and said second storage device including a photoconductor optically associated therewith and electrically connected to said first storage device, said photoconductor being adapted to disable said first storage device upon illumination of said second storage device lamp.

5. A pulse former comprising:

first, second, third and fourth cascade connected switching devices each comprising a voltage responsive lamp and a plurality of associated photoconductors arranged for illumination thereby, each of the first three of said devices having a pick-up photoconductor optically associated therewith and electrically connected to the following switching device, said photoconductors being adapted to turn on the lamp of the following switching device;

the fourth device including at least one photoconductor optically associated therewith and adapted to provide an output pulse upon the energization of said fourth device;

said third device comprising a first storage device including a photoconductor optically associated therewith and electrically connected thereto in a self-latching circuit configuration to maintain the associated lamp in the energized condition independent of the preceeding device;

a second storage device having an associated photoconductor optically associated therewith and electrically connected thereto in a self-latching circuit configuration;

said first storage device having a photoconductor optically associated therewith and electrically connected to said second storage device, said photoconductor adapted to form a pick-up circuit to enable said second storage device;

said second switching device including a photoconductor optically associated therewith and electrically connected to said second storage device and adapted to shunt said last-mentioned pick-up circuit thereby maintaining said second storage device in a disabled condition;

the fourth of said switching devices including a photoconductor optically associated therewith and electrically connected to said first switching device, said photoconductor being adapted to disable said first switching device lamp to provide for deenergization of said first and second switching devices thereby energizing said second storage device; and said second storage device including a photoconductor optically associated therewith and electrically connected to said first storage device, said photoconductor being adapted to disable said first storage device.

6. A pulse former comprising:

first, second, third and fourth cascade connected switching devices each comprising a voltage responsive lamp and a plurality of associated photoconductors arranged for illumination thereby, each of the first three of said devices having a pick-up photoconductor optically associated therewith and electrically connected, respectively, to the following switching device, said photoconductors being adapted to turn on the lamp of the following switching device;

said fourth device including at least one photoconductor optically associated therewith and adapted to provide an output pulse upon the energization of said fourth device;

said third device comprising a first storage device including a photoconductor optically associated therewith and electrically connected thereto in a self-latching circuit configuration to maintain the associated lamp in the energized condition independent of the preceding device;

a second storage device having an optically associated photoconductor electrically connected thereto in a self-latching circuit configuration;

said first storage device having a photoconductor optically associated therewith and electrically connected to said second storage device, said photoconductor being adapted to form a pick-up circuit to energize said second storage device;

said second switching device including a photoconductor optically associated therewith and electrically connected to said second storage device, said photoconductor being adapted to shunt said last-mentioned pick-up circuit to maintain said second storage device in a disabled condition;

the fourth of said switching devices including a photoconductor optically associated therewith and electrically connected to said first switching device, said photoconductor being adapted to disable said first switching device lamp to provide for deenergization of said first and second switching devices thereby enabling said second storage device;

said second storage device including a photoconductor optically associated therewith and electrically connected to said first device, said photoconductor being adapted to disable said first storage device;

third and fourth storage devices;

said second and third storage devices each having pick-up photoconductors optically associated therewith and electrically connected respectively to said third and fourth storage devices, said photoconductors being adapted to energize the lamps of said third and fourth storage devices;

said third and fourth storage device lamps each having photoconductors optically associated therewith and electrically connected thereto in self energizing circircuit configuration;

said third and fourth storage devices each including photoconductors optically associated therewith and electrically connected in shunt with said second and third storage devices, respectively, said photoconductors being adapted to disable said second and third storage devices, respectively;

said third storage device including a photoconductor optically associated therewith and electrically connected in shunt with the lamp of said first storage device for disablement thereof, said third storage device also including a photoconductor optically associated therewith and electrically connected to said fourth switching device, said photoconductor being adapted to provide a pick-up circuit for the lamp of said fourth switching device, said last-mentioned photoconductor being connected in parallel with the pick-up photoconductor of said first storage device; and the pick-up circuit for said fourth storage device being connected in parallel with the pick-up circuit for said second storage device and subject to disablement by the disablement photoconductor of said second switching device.

References Cited by the Examiner

UNITED STATES PATENTS

| | | | |
|---|---|---|---|
| 2,907,001 | 9/59 | Loebner | 250—213 |
| 2,985,763 | 5/61 | Ress | 250—209 |
| 2,988,645 | 6/61 | Wilmotte | 250—209 |
| 3,073,963 | 1/63 | Marko | 250—209 X |

OTHER REFERENCES

Corradetti: IBM Technical Disclosure Bulletin, vol. 4, No. 5; October 1961, pp. 70, 71.

RALPH NILSON, *Primary Examiner.*

WALTER STOLWEIN, *Examiner.*